US006418357B1

(12) United States Patent
Chodack et al.

(10) Patent No.: US 6,418,357 B1
(45) Date of Patent: Jul. 9, 2002

(54) METHOD FOR SYNCHRONIZING AN ENVELOPE INSERTER

(75) Inventors: Jeffrey L. Chodack, New Milford; Robert Francisco, New Fairfield; Edilberto I. Salazar, Brookfield, all of CT (US); John W. Sussmeier, Cold Spring, NY (US)

(73) Assignee: Pitney Bowes Inc., Stamford, CT (US)

( * ) Notice: Subject to any disclaimer, the term of this patent is extended or adjusted under 35 U.S.C. 154(b) by 67 days.

(21) Appl. No.: 09/648,577

(22) Filed: Aug. 28, 2000

(51) Int. Cl.$^{7}$ .................................................. G06F 7/00

(52) U.S. Cl. .................... 700/220; 700/213; 270/58.06; 270/58.02; 414/790.3

(58) Field of Search ................................ 700/213, 220, 700/227; 270/58.06, 58.02, 58.29; 414/790.3; 271/270

(56) References Cited

U.S. PATENT DOCUMENTS 5,521,627 A * 5/1996 Keung et al. ............... 347/218
5,772,194 A * 6/1998 Huebler et al. ............... 270/45
5,941,516 A * 8/1999 Emigh et al. ............ 270/58.06
6,301,522 B1 * 10/2001 Salazar et al. .............. 700/213
6,311,104 B1 * 10/2001 Shea et al. ............... 270/52.02

* cited by examiner

*Primary Examiner*—Christopher P. Ellis
*Assistant Examiner*—Patrick Mackey

(74) *Attorney, Agent, or Firm*—Christopher J. Capelli; Angelo N. Chaclas

(57) ABSTRACT

A method for dynamically determining a motion control profile used in controlling motion of an axis of an overhead transport motor so as to be synchronized to the motion of a collating transport motor of an insertion engine used to insert a collation into an envelope when the collating transport motor causes a collating pusher to handoff the collation to an overhead pusher being driven by the overhead transport motor. The motion profile consists of a finite number of segments and repeats after the finite number of segments, the finite number of segments constituting a cycle. The method includes the steps of: electronically gearing the overhead transport motor to the collating transport motor from the beginning of a cycle until handoff; based on position information provided by a sensor, determining whether the collating transport is decelerating between handoff and insertion; and using either forward integration or electronic gearing of the overhead transport motor to the collating transport motor up until the collating transport motor is first determined to be decelerating between handoff and insertion, and using forward integration when the collating transport motor is first determined to be decelerating between handoff and insertion and continuing the forward integration until insertion. In some applications, the forward integration is used when the collating transport motor is first determined to be decelerating between handoff and insertion and continuing the forward integration until the end of the cycle.

3 Claims, 5 Drawing Sheets

METHOD FOR SYNCHRONIZING AN ENVELOPE INSERTER

FIELD OF THE INVENTION

The present invention pertains to methods for automatically assembling or collating or singulating of sheets of media such as paper, such as is done by mailing systems when assembling and inserting sheets into envelopes. More particularly, the present invention pertains to controlling the motion of pushers that push sheets through a sheet handling device, such as a mailing machine, a postage meter, an envelope printer or inserter, and including a high-speed inserter.

BACKGROUND OF INVENTION

General Discussion

A typical sheet or envelope handling device includes various structures, motors and sensors. For example, a typical envelope handling device includes an envelope feeding structure for feeding an envelope or a batch of envelopes in singular fashion in a downstream path of travel to a work station. Typical envelope handling devices employ ejection rollers or ejection belts operating at a constant speed, or at some speed that varies as a function of time, speeds chosen so as to avoid envelope collisions and noise, and also to avoid so-called bounce-back from a wall when an envelope strikes a wall designed to stop its forward travel and cause it to drop onto the top of a stack. Depending on how the envelope moves through the device, more or less noise and bounce-back will result. It is beneficial to control to a fine degree the motion of a sheet or envelope handling device so as to keep noise and undesirable motion of the sheets or envelopes to a minimum.

The prior art uses motion profiles to express, as a function of time, the velocity/speed of an axis of a motor that causes motion of a sheet in a mailing system. A motion profile consists of a series of segments, each segment having a duration and each corresponding to a state of motion of an axis of a motor ultimately responsible for imparting motion to a sheet or envelope.

For example, a motor may have an axis that in rotating pulls a sheet through part of a mailing system at a certain speed, after accelerating at a specified acceleration as a function of time, and concluding with some specified deceleration as a function of time. If the sheet does not slip, then the motion of the sheet can be correlated precisely with the motion of the axis of the motor: the sheet moves through the mailing system with a speed that is exactly equal to the speed of rotation of the part of the axis in contact with the sheet, i.e. usually the surface of a belt driven by the axis. In this case, commands are sometimes sent to a motor to impart motion to a sheet for a series of time segments, the commands being based simply on the assumption that the motion of the axis of the motor causing the motion of the sheet can be equated to the motion of the sheet.

On occasion, however, a sheet in a sheet handling device will slip so that the motion of the axis does not necessarily indicate the motion of a sheet (or envelope). Then the motion of an axis of a motor can be conditioned based on receiving commands from sensors used to detect the presence of the sheet as it moves through the sheet handling device.

Whether commands are sent based on a sheet not slipping, or based on information from sensors, the commands can be sent without regard to, i.e. independent of, the motion of the axis of any other motor. It is also possible, however, to send commands to a motor based on the motion of other motors.

The sending of commands to a motor based on the motion of (the axis) of another motor (which motion can be based on the motion of still a third motor, and so on), was in the past accomplished using mechanical gearing. Today, motors can be made to communicate electronically and use what is now sometimes referred to as electronic gearing, but also known as displacement mapping, in which the motion of the axis of one motor is expressed in terms depending only on the motion of the axis of another motor, whether or not there is slippage.

Problem in Synchronizing an Insertion Engine to a Collating Transport for a High-speed Inserting Machine Motion control according to the above-described techniques is advantageously used in synchronizing an insertion engine to a collating transport for a high-speed inserting machine, i.e. in a high-speed inserter that gathers sheets to be inserted into an envelope and then inserts the collation (gathered sheets) into the envelope. The combined operations of gathering the sheets of a collation and then inserting the collation into an envelope must be precisely coordinated (at least in the case of a high-speed inserting machine) so as not to wrinkle the sheets in the transition from gathering to inserting, or to lose control of the collation in the act of inserting the collation into the envelope, such as for example by a premature deceleration of a pusher forcing the collation into the envelope. The gathering of the sheets of a collation is performed by what is called a collating transport, including a motor driving a belt with a pusher attached to the belt, and the inserting of a collation into an envelope is performed by what is here called an insertion engine, including various components and in particular an overhead pusher transport which in turn includes a motor driving a belt with an attached pusher.

What is needed is a methodology for providing motion profiles that express the required motion of the axis of the collating transport motor and also that of the insertion engine so as to precisely coordinate the motion of the two axes and so as to maintain control over the collation throughout the insertion process.

SUMMARY OF THE INVENTION

Accordingly, the present invention provides a method for dynamically determining a motion control profile used in controlling motion of an axis of an overhead transport motor so as to be synchronized to the motion of a collating transport motor of an insertion engine used to insert a collation into an envelope when the collating transport motor causes a collating pusher to handoff the collation to an overhead pusher being driven by the overhead transport motor, the motion profile consisting of a finite number of segments and repeating after the finite number of segments, the finite number of segments constituting a cycle, the method including the steps of: electronically gearing the overhead transport motor to the collating transport motor from the beginning of a cycle until handoff; based on position information provided by a sensor, determining whether the collating transport is decelerating between handoff and insertion; and using either forward integration or electronic gearing of the overhead transport motor to the collating transport motor up until the collating transport motor is first determined to be decelerating between handoff and insertion, and using forward integration when the collating transport motor is first determined to be decelerating between handoff and insertion and continuing the forward integration until insertion.

In a further aspect of the invention, the forward integration is used when the collating transport motor is first determined to be decelerating between handoff and insertion and continuing the forward integration until the end of the cycle.

In another further aspect of the invention, the electronic gearing is used from insertion until the end of the cycle.

BRIEF DESCRIPTION OF THE DRAWINGS

The above and other features and advantages of the invention will become apparent from a consideration of the subsequent detailed description presented in connection with accompanying drawings, in which.

DETAILED DESCRIPTION OF A PREFERRED EMBODIMENT

Figure 1:
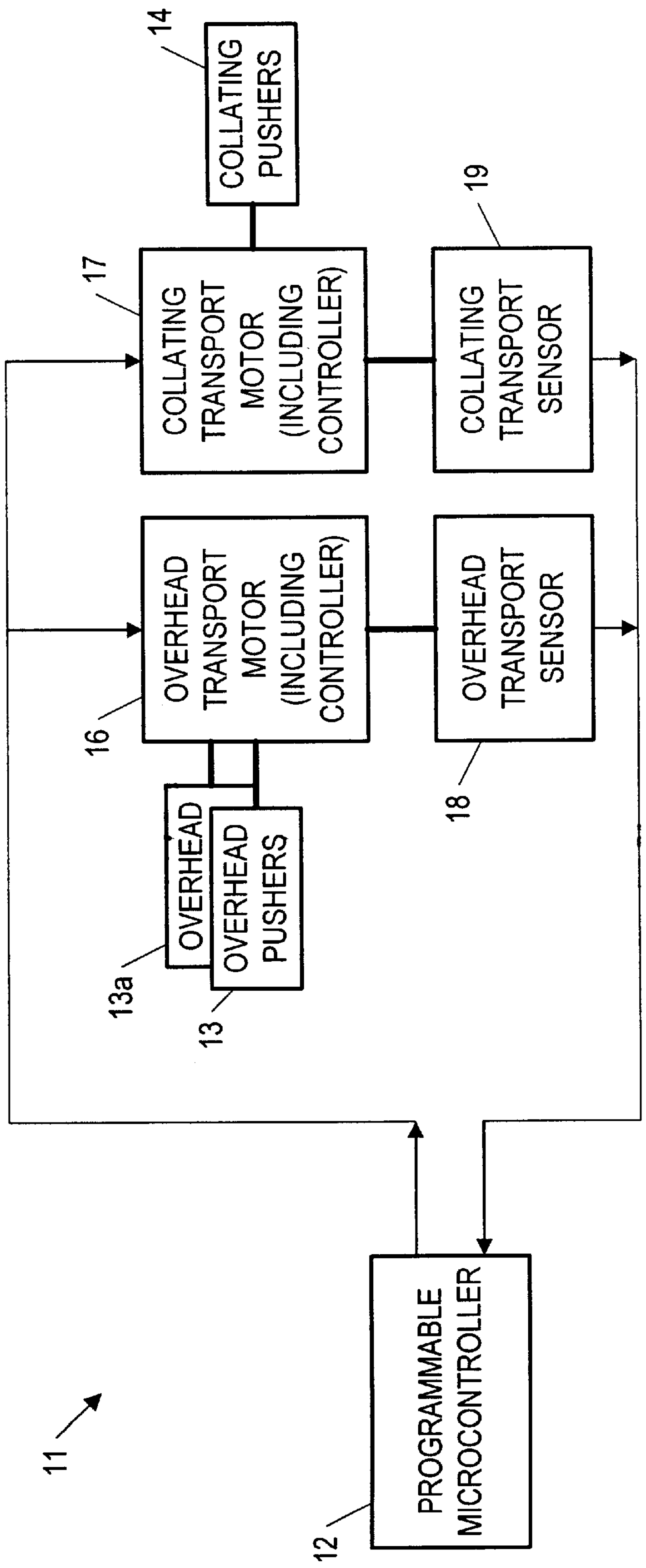
FIG. 1 is a block diagram of a system for gathering a collation and inserting it into an envelope, the system including a collating transport and an overhead transport executing cyclical motion.
Figure 2A:
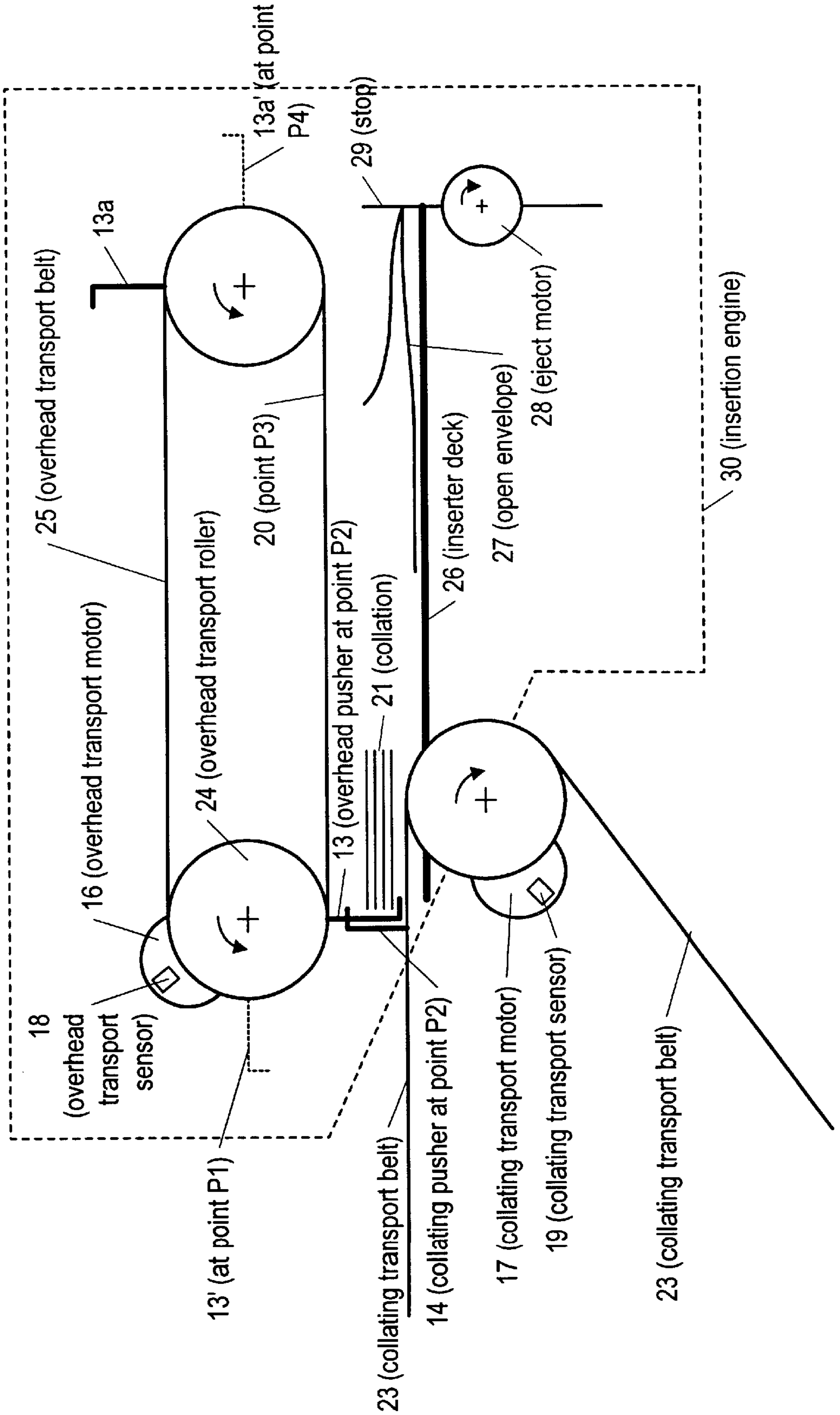
FIG. 2A is a schematic of a side view of the overhead transport interface to the collating transport, the view being for the point in a cycle when handoff of a collation occurs from the collating transport to the overhead transport.
Figure 2B:
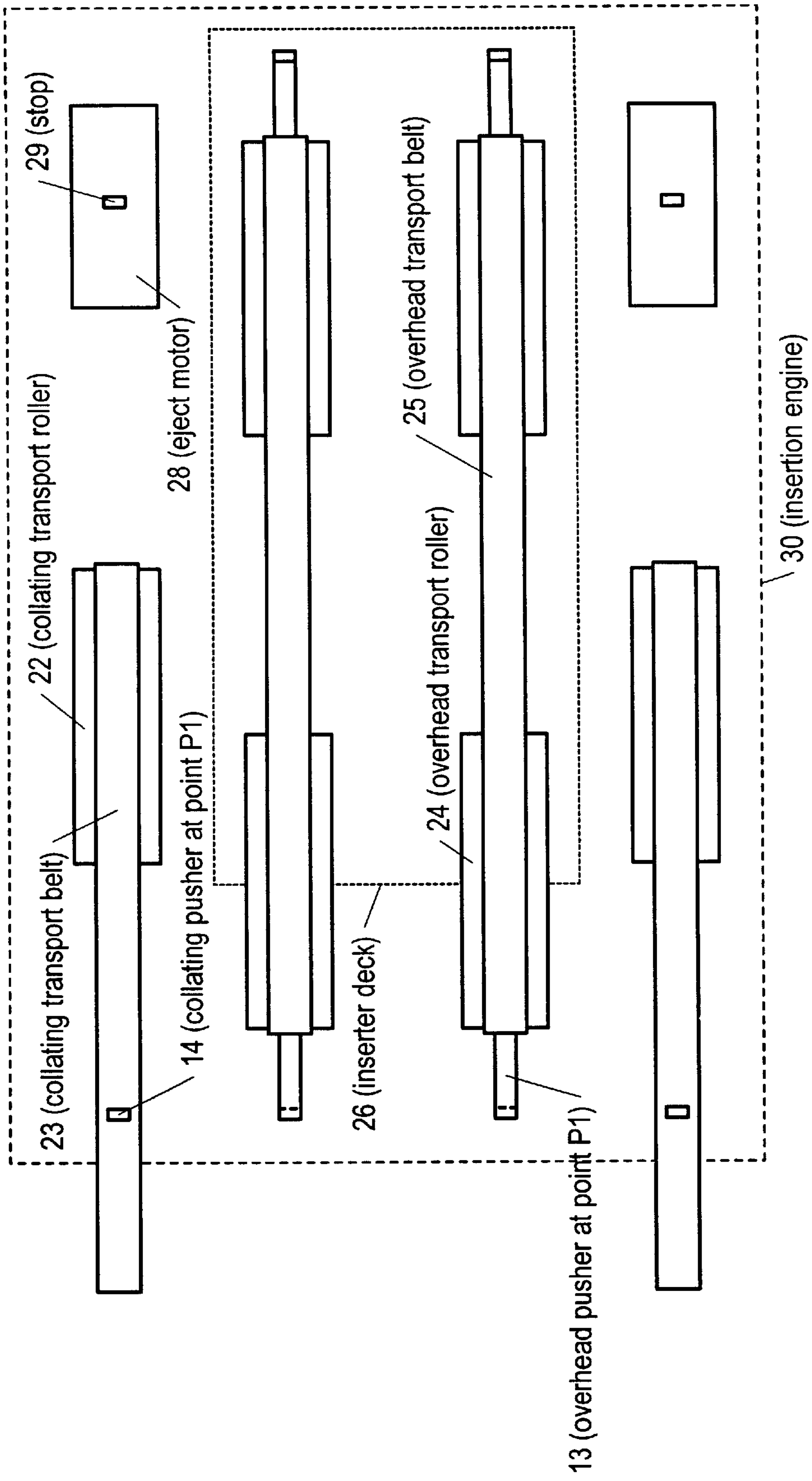
FIG. 2B is a schematic of a top view corresponding to the side view of FIG. 2A, but at the beginning of a cycle, before handoff.

Referring now to FIGS. 1, 2A and 2B, a mail processing system 11 for gathering a collation and inserting it into an envelope is shown as including a programmable microcontroller (FIG. 1 only) that stores and executes instructions corresponding to a motion control profile according to the present invention. (Such a motion control profile is as described below in connection with FIGS. 2–4.) The microcontroller 12 communicates commands, associated with the stored instructions, to an overhead transport motor 16 (i.e. to its controller) and also to a collating transport motor 17, both included within an insertion engine 30. The microcontroller uses information provided by an overhead transport sensor 18 and a collating transport sensor 19 on which to base the commands it sends to the motors 16 and 17. The information provided by the sensors 16 and 17 allows so-called electronic gearing (displacement mapping) of the overhead transport motor 16 to the collating transport motor 17.

Referring for the moment particularly to FIGS. 2A and 2B, a collation 21 is gathered and transported to point P2 (handoff position) by collating pushers 14. Based on information the programmable microcontroller 12 receives from the sensors 18 and 19, it commands the motors 16 and 17 so as to arrange that the collating pushers 14 arrive at point P2 for handoff of the collation from the collating pushers 14 to overhead pushers 13 at substantially the same moment as do the overhead pushers. There are two overhead pushers 13 and 13*a* for an overhead pusher belt 25. Each of the two overhead pushers 13 and 13*a* is connected to the overhead pusher belt 25, so that when an overhead pusher 13 completes a cycle and reaches point P4 (FIG. 1), the other overhead pusher 13*a* is in position to begin a new cycle at point P1. FIG. 2 also shows, in ghost, the two pairs of overhead pushers 13 and 13*a* at an earlier time, namely the beginning of a cycle.

After handoff, the overhead transport motor 16 drives overhead transport motors 24, which in turn drive the overhead transport belts 25, so that the (pair of) overhead pushers 13 push the collation 21 toward a point P3 on the way for insertion to an open envelope 27. The collation is pushed by the overhead pushers 13 along an inserter deck 26. Also just after handoff, the collating pushers 14 are pulled beneath the inserter deck 26 as the collating transport motor 17 continues to rotate collating transport rollers 22 which drive collating transport belts 23.

After insertion at point P3, i.e. after the collation 21 is inserted into the open envelope 27, an eject motor 28 rotates stop 29 out of the way of the envelope with its inserted collation, and the envelope is pushed onto a conveyor (not shown) or into a nip (not shown) so as to continue to a later processing stage (not shown) in the overall mail processing system.

The overhead transport sensor (encoder) 18 is integral with the overhead transport motor 16, and the collating transport sensor (encoder) 19 is integral with the collating transport motor 17. Both send position information to the programmable microcontroller 12 (FIG. 1 only) typically every 500 microseconds.

If at handoff the velocity of the overhead pushers 13 were not greater than that of the collating pushers 14, then the collating pusher could continue to push the collation 21 for some period after handoff, and the overhead pushers would not move the collation away from the collating pushers so as to allow the collating pushers to move beneath the collation 21 and the inserter deck 26 in their traverse of a collating transport machine cycle (FIG. 1). Even after the collation pushers move below the inserter deck 26, however, if the overhead transport decelerates between handoff and insertion, then positive control over the collation will be lost. Thus, not only is it essential that the overhead pushers 13 and the collating pushers 14 arrive at point P1 at the same time, but the overhead pushers must move away from the point of handoff faster than the collating pushers, and must not decelerate between handoff and insertion, at point P3. In a representative application, at handoff, the collating pushers 14 are moving at 67.5 inches per second, and the overhead pushers 13 are moving at 100 inches per second.

Figure 3:
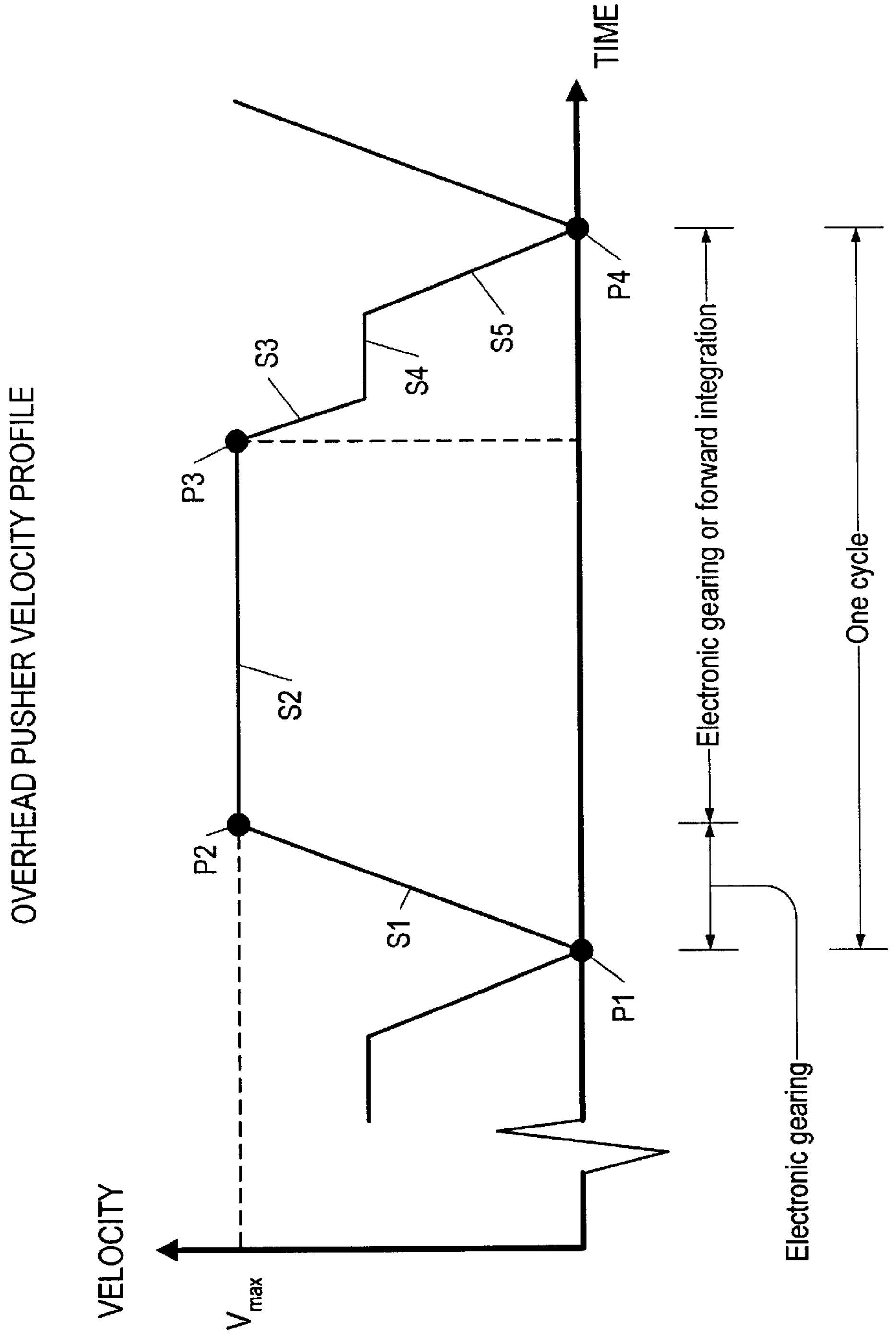
FIG. 3 is a scaleable, template motion control profile for the overhead transport.
Figure 4:
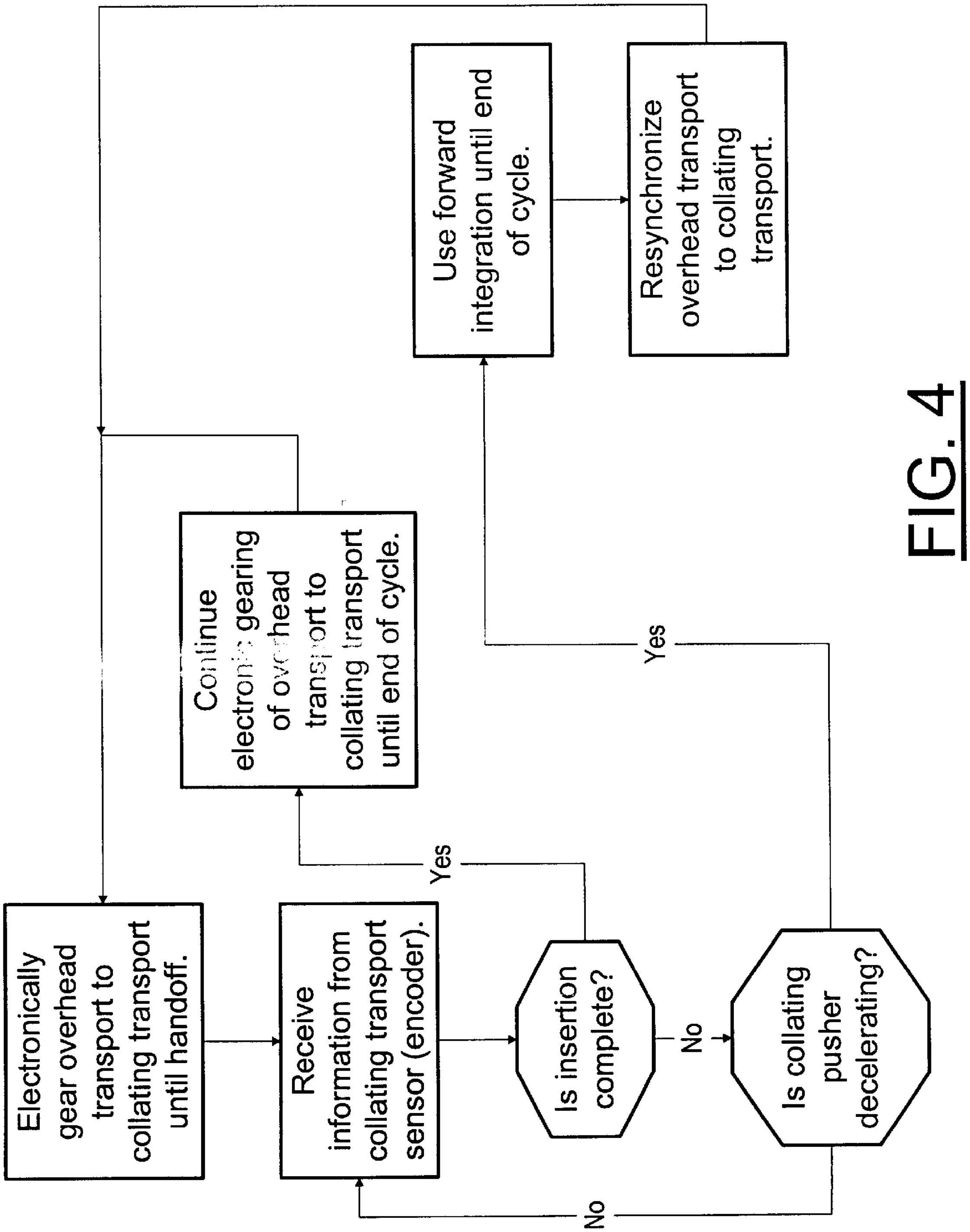
FIG. 4 is a flow chart indicating the method of the present invention for dynamically developing a motion control profile for the overhead transport based on information received from a position sensor (encoder) about the position of the collating transport.

Referring now to FIG. 3, an overhead pusher velocity profile is shown indicating steady state motion of the overhead pusher (and correspondingly, the motion of the overheard transport motor axis) for one machine cycle, i.e. for the overhead pusher 13 moving from point P1 to point P2 to point P3 and on to point P4. (When the overhead pusher that was at point P1 at the beginning of the machine cycle arrives at point P4, the overhead pusher that was at point P4 at the beginning of the same machine cycle ends up at point P1, ready to begin a new machine cycle.) The motion profile of FIG. 3 is said to be for steady state in that the motion of the collating pusher, which affects the motion of the overhead pusher as described below, is constant speed, and also that no error conditions exist. The overhead pusher velocity profile serves as a template for the programmable microcontroller 12; it is adjusted to meet the requirement that the overhead pusher motion be synchronized to the motion of the collating pusher at handoff (point P2) of a collation, and that the overhead pusher not lose control of the collation in delivering the collation to the insertion point P3. Fixed displacements in the motion of the overhead pusher are represented in FIG. 3 by S1, S2, S3, S4 and S5.

Since absolute mechanical synchronism is required between the overhead transport motor and the collating transport motor during the interval leading to handoff (from point P1 to point P2), the overhead transport motor is displacement mapped (or electronically geared with start and stop capability) to the collating transport motor during the motion of the overhead pusher from point P1 to point P2.

Other activities of the insertion engine must be synchronized to the motion of the overhead pusher, and so are displacement mapped to the overhead transport motor. Thus, the overhead transport motor is said to be slaved to the collating transport motor, but the motors that effect the activities that must be synchronized to the motion of the overhead pusher are slaved to the overhead transport motor.

Still referring to FIG. 3, since in order to ensure that the overhead pusher maintain positive control over a collation from handoff to insertion it is necessary that at the point of handoff the overhead pusher not decelerate, the overhead pusher cannot be electronically geared to the collating pusher during the interval from P2 to P3 if the collating pusher decelerates at handoff. If the collating pusher does decelerate at handoff, instead of using electronic gearing to determine the motion of the overhead pusher from handoff to insertion, the method of forward integration is used, holding the velocity of the overhead pusher equal to its handoff value for a time sufficient for it to reach point P3 (insertion).

In the forward integration, the remainder of the profile is executed at a scaled, reduced rate $R=V_A/V_{max}$, where $V_A$ is the actual velocity of the overhead pusher at handoff (point P2), and $V_{max}$ is a predetermined constant, independent of the type of envelope being processed. Velocities are scaled by R and accelerations are scaled by R2. Thus, in the example mentioned above where at handoff the collating pushers move at 67.5 inches per second and the overhead pushers move at 100 inches per second for one kind of envelope (so that the electronic gearing provides that the overhead pushers, when geared to the collating pushers, run at 100/67.5 times the velocity of the collating pushers), if $V_{max}$ is 100 inches per second, then if the collating pushers at handoff are moving at only 33.75 inches per second (usually because a larger envelope is being processed), then the electronic gearing will force the overhead pushers to run at only 50 inches per second (33.75□100/67.5), and the forward integration will then be scaled by the rate R=50/100 for the interval from P2 (handoff) to P4 (end of cycle).

The overhead transport motor resynchronizes itself with the collating transport motor at the end of each machine cycle, i.e. at point P4, in preparation for the next cycle.

If the collating pusher maintains a constant or increasing speed after handoff until the overhead pusher reaches point P3 (insertion), it is possible and indeed preferable to keep the overhead transport motor electronically geared to the collating transport motor throughout the entire machine cycle. Forward integration is used typically only if the collating pusher decelerates between handoff and insertion.

In some applications it is advantageous to improve the match between the collating pusher motion and that of the overhead transport by shifting the time of handoff to an earlier time (to the left in FIG. 3), so that the speed of the overhead pusher matches or approaches that of the collating transport at handoff. The remainder of the overhead velocity profile is then altered to satisfy pusher position requirements leading to an insertion.

It is important to understand that the present invention comprehends developing the motion profile of the overhead transport motor dynamically, i.e. the programmable microcontroller 12 (FIG. 1) determines whether to employ forward integration or electronic gearing (after handoff) based on the information it receives from the sensor (encoder) 19 (FIG. 2A) of the collating transport motor. What is preprogrammed is only whether forward integration is to be used even if the collating pusher 14 does not decelerate between handoff and insertion. If the collating pusher does not decelerate in the interval between handoff and insertion, the programmable microcontroller preferably uses electronic gearing throughout the entire machine cycle of the overhead electronic transport. However, if the collating pusher first decelerates at some time after handoff but before insertion, the programmable microcontroller will use electronic gearing up until it first receives information indicating that the collating pusher is decelerating, and will preferably switch to forward integration from that point until the end of the machine cycle, or optionally will switch to forward integration only during the period from the time when the collating pusher is first determined to be decelerating until insertion.

It is to be understood that the above described arrangements are only illustrative of the application of the principles of the present invention. Numerous modifications and alternative arrangements may be devised by those skilled in the art without departing from the spirit and scope of the present invention, and the appended claims are intended to cover such modifications and arrangements.

What is claimed is:

1. A method for dynamically determining a motion control profile used in controlling motion of an axis of an overhead transport motor so as to be synchronized to the motion of a collating transport motor of an insertion engine used to insert a collation into an envelope when the collating transport motor causes a collating pusher to handoff the collation to an overhead pusher being driven by the overhead transport motor, the motion profile consisting of a finite number of segments and repeating after the finite number of segments, the finite number of segments constituting a cycle, the method comprising the steps of:

a) electronically gearing the overhead transport motor to the collating transport motor from the beginning of a cycle until handoff;

b) based on position information provided by a sensor, determining whether the collating transport is decelerating between handoff and insertion; and c) using either forward integration or electronic gearing of the overhead transport motor to the collating transport motor up until the collating transport motor is first determined to be decelerating between handoff and insertion, and using forward integration when the collating transport motor is first determined to be decelerating between handoff and insertion and continuing the forward integration until insertion.

2. The method of claim 1, wherein forward integration is used when the collating transport motor is first determined to be decelerating between handoff and insertion and continuing the forward integration until the end of the cycle.

3. The method of claim 1, wherein electronic gearing is used from insertion until the end of the cycle.

* * * * *